(12) United States Patent
Horiuchi et al.

(10) Patent No.: US 11,733,162 B2
(45) Date of Patent: Aug. 22, 2023

(54) ULTRAVIOLET DETECTION MATERIAL AND ULTRAVIOLET DETECTION DEVICE

(71) Applicant: SHINKO ELECTRIC INDUSTRIES CO., LTD., Nagano (JP)

(72) Inventors: Michio Horiuchi, Nagano (JP); Masaya Tsuno, Matsumoto (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 17/591,307

(22) Filed: Feb. 2, 2022

(65) Prior Publication Data

US 2022/0244180 A1    Aug. 4, 2022

(30) Foreign Application Priority Data

Feb. 4, 2021    (JP) ................. 2021-016885

(51) Int. Cl.
    *G01N 21/64*    (2006.01)
(52) U.S. Cl.
    CPC .................... *G01N 21/64* (2013.01)
(58) Field of Classification Search
    CPC .. G01N 21/64; C01P 2002/52; C01P 2002/72; C01P 2002/80; C01F 7/166; G01J 1/429; G01J 1/58; Y02A 50/30
    See application file for complete search history.

(56) References Cited

U.S. PATENT DOCUMENTS

| 5,015,909 A * | 5/1991 | Zhong ................... H01J 43/246 501/61 |
| 11,561,516 B2 * | 1/2023 | Kim ..................... G05B 13/027 |

| 2010/0200874 A1 | 8/2010 | Shioi et al. |
| 2012/0212962 A1 | 8/2012 | Yasumori et al. |
| 2013/0154141 A1 | 6/2013 | Shioi et al. |
| 2019/0264101 A1 * | 8/2019 | Pousthomis ............ C03C 1/008 |

FOREIGN PATENT DOCUMENTS

| JP | 2007-234441 | 9/2007 |
| JP | 2008-303365 | 12/2008 |
| JP | 2009-286995 | 12/2009 |
| JP | 2011-116633 | 6/2011 |
| JP | 2014-133837 | 7/2014 |

OTHER PUBLICATIONS

Rattanakul et al., Inactivation kinetics and efficiencies of UV-LEDs against Pseudomonasaeruginosa, Legionella pneumophila, and surrogate microorganisms, Water Research 130 (2018) pp. 31-37, English text, Discussed in apecification, 7 pages.

Beggs et al., Upper-room ultraviolet air disinfection might help to reduce COVID-19 transmission in buildings, medRxiv preprint doi:, https://doi.org/10.1101/2020.06.12.20129254; (2020), English text, 19 pages.

* cited by examiner

*Primary Examiner* — David P Porta
*Assistant Examiner* — Mamadou Faye
(74) *Attorney, Agent, or Firm* — Rankin, Hill & Clark LLP

(57) ABSTRACT

An ultraviolet detection material includes a composite oxide including aluminum, strontium, cerium, lanthanum and manganese, and a glass having a softening point of 900° C. or lower. The ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

6 Claims, 10 Drawing Sheets

ULTRAVIOLET DETECTION MATERIAL AND ULTRAVIOLET DETECTION DEVICE

CROSS-REFERENCE TO RELATED APPLICATIONS

This application is based on and claims the benefit of priority from prior Japanese patent application No. 2021-016885 filed on Feb. 4, 2021, the entire contents of which are incorporated herein by reference.

TECHNICAL FIELD

The present invention relates to an ultraviolet detection material and an ultraviolet detection device.

BACKGROUND ART

In general, ultraviolet refers to an electromagnetic wave having a wavelength of 400 nm or shorter. However, ultraviolet includes UV-A having a wavelength of 315 to 400 nm, UV-B having a wavelength of 280 to 315 nm, UV-C having a wavelength of 280 nm or shorter, and the like. A variety of methods of detecting the ultraviolet are being studied.

For example, an ultraviolet detection material including Zn, Si, Al, B and O and having a zinc silicate crystal structure may be exemplified. In the ultraviolet detection material, a mole ratio of Zn to Si is 1.0 or larger and 3.0 or less, in oxide terms. B is included in an amount of 14 mol % or more and 25 mol % less, in oxide terms, and Al is included in an amount of more than 0 mol % and 6 mol % or less, in oxide terms (for example, refer to PTL 1). In addition, the technologies disclosed in PTLs 2 to 5 may be exemplified.

In recent years, sterilization and virus inactivation effects of the ultraviolet have been attracting attention. Along with this, it is desired to accurately detect the ultraviolet that also affects human bodies. It is UV-C that has high sterilization and virus inactivation effects (for example, refer to NPTLs 1 and 2). It is also UV-C that highly affects human bodies. That is, it is the ultraviolet having a wavelength of 200 to 300 nm that has the sterilization effect, and the sterilization effect of UV-C is highest. Similarly, it is the ultraviolet having a wavelength of 200 to 310 nm that affects human bodies, and UV-C has the greatest effect on human bodies.

CITATION LIST

Patent Literature

PTL 1: JP-A-2014-133837
PTL 1: JP-A-2011-116633
PTL 3: JP-A-2008-303365
PTL 4: JP-A-2007-234441
PTL 5: JP-A-2009-286995

Non Patent Literature

NPTL1: Rattanakul et al, Inactivation kinetics and efficiencies of UV-LEDs against *Pseudomonas aeruginosa, Legionella pneumophila*, and surrogate microorganisms, Water Research 130(2018) 31-37)
NPTL 2: Beggs et al, Upper-room ultraviolet air disinfection might help to reduce COVID-19 transmission in buildings, medRxiv preprint doi: https://doi.org/10.1101/2020.06.12.20129254; (2020)

SUMMARY OF INVENTION

However, despite a fact that UV-C having a relatively short wavelength has a great effect on living organisms and viruses, in the ultraviolet detection of the related art, it is difficult to detect only UV-C because it is not possible to distinguish wavelength regions of the ultraviolet. There is no description that the ultraviolet detection material disclosed in PTL 1 is excited only by UV-C, and it is thought that the ultraviolet detection material is excited even by an excitation wavelength other than UV-C.

The present invention has been made in view of the above situations, and an object thereof is to provide an ultraviolet detection material capable of distinctively detecting a wavelength region of UV-C.

An embodiment of the present disclosure relates to an ultraviolet detection material. The ultraviolet detection material comprises:

a composite oxide including aluminum, strontium, cerium, lanthanum and manganese; and a glass having a softening point of 900° C. or lower, wherein the ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

According to the disclosed technology, it is possible to provide the ultraviolet detection material capable of distinctively detecting a wavelength region of UV-C.

DESCRIPTION OF EMBODIMENTS

Figure 1:
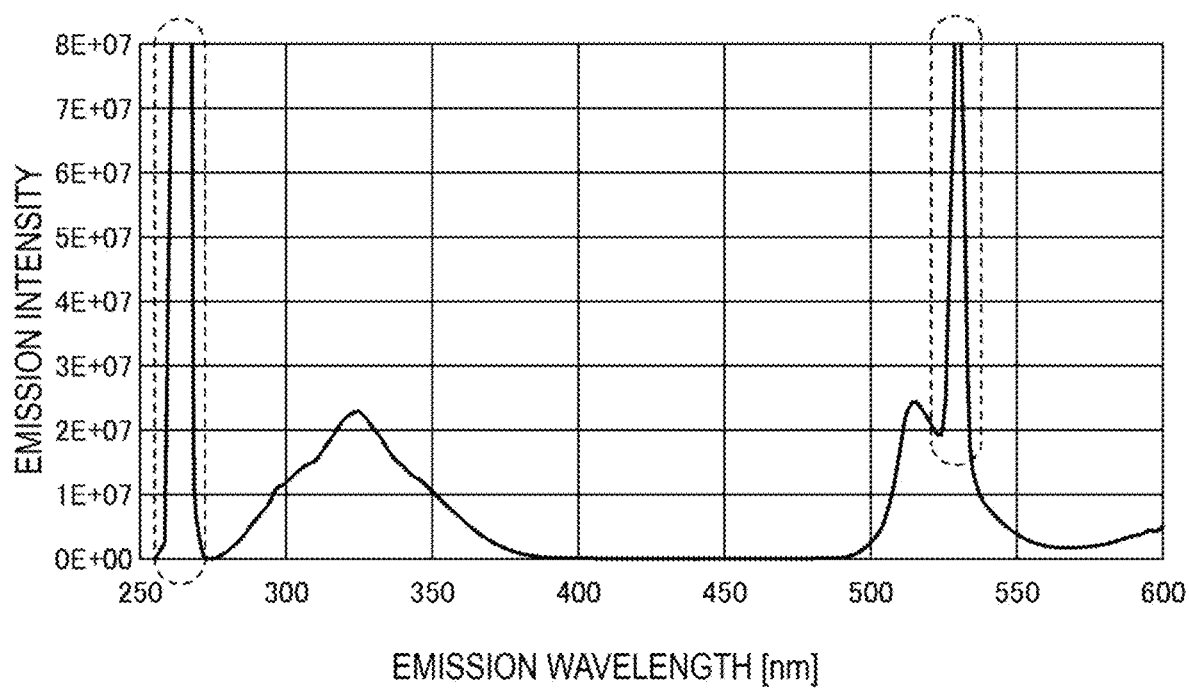
FIG. 1 shows a characteristic example of an ultraviolet detection material according to the present embodiment.

Hereinafter, embodiments of the present invention will be described with reference to the drawings. Note that, in the respective drawings, the parts having the same configurations are denoted with the same reference signs, and the overlapping descriptions may be omitted.

[Ultraviolet Detection Material]

An ultraviolet detection material according to the present embodiment (hereinafter, for convenience, referred to as 'ultraviolet detection material 10') is a mixture of a composite oxide in which a plurality of types of oxides is composited, and glass having a softening point of 900° C. or lower. The composite oxide included in the ultraviolet detection material 10 includes oxides of aluminum, strontium, cerium, lanthanum and manganese.

The ultraviolet detection material 10 is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter. That is, the ultraviolet detection material 10 is not excited even when irradiated with UV-A, but is excited to emit light when irradiated with UV-C. In order to facilitate the excitation with UV-C, the excitation wavelength peak of the ultraviolet detection material 10 is preferably 280 nm or shorter. Note that, in the ultraviolet detection material 10, it is the composite oxide that contributes to the light emission, and the glass does not contribute to the light emission.

It is desirable that the glass included in the ultraviolet detection material 10 has a transmissivity of 50% or more for an electromagnetic wave having a wavelength of 260 nm. In addition, a mixed amount (content rate) of the composite oxide in the ultraviolet detection material 10 is preferably 60 vol % or more. That is, since the glass generally has the low ultraviolet transmissivity, it is preferable to select glass having high transmissivity at 280 nm or shorter, which is particularly a region of UV-C, and to use the glass as little as possible. That is, the glass is preferably used in a minimum amount necessary for binding particles of the composite oxide.

The preferable glass that is used for the ultraviolet detection material 10 is not particularly limited as long as the softening point is 900° C. or lower. However, glass having bismuth oxide as a main component or having silicon oxide and barium oxide as main components and including boron oxide may be exemplified. That is, a bismuth oxide-boric acid system, a silicon oxide-barium oxide-boric acid system, and the like may be exemplified. In addition to these systems, a silicon oxide-zinc oxide-boric acid system, phosphoric acid-copper oxide, and the like may also be used. When these glasses are used, UV-C can be transmitted to some extent, without significantly hindering transmission of UV-C. Therefore, the ultraviolet detection material 10 can be excited to emit light at wavelengths in a visible light region when irradiated with UV-C.

Among these glasses, the bismuth oxide-boric acid system and the phosphoric acid-copper oxide are preferable because they have a softening point of 500° C. or lower. If the softening point of glass is low, a firing temperature can be lowered when printing and firing the ultraviolet detection material 10 in paste form on a ceramic substrate, a metal substrate or the like. The low firing temperature is desirable, in that reaction between the ultraviolet detection material 10 and the ceramic substrate, the metal substrate or the like can be suppressed. Note that, it is also effective to further lower the softening point by adding an alkali metal oxide such as Na2O and K2O to the glass.

FIG. 1 shows a characteristic example of the ultraviolet detection material according to the present embodiment, showing emission intensity when the ultraviolet detection material 10 is excited by electromagnetic waves having excitation wavelengths near 265 nm. In FIG. 1, the strong light emission can be seen in the ultraviolet light region of 300 nm to 350 nm and in the visible light region of 500 nm to 550 nm (green band, the peak wavelength is about 520 nm). That is, the ultraviolet detection material 10 is excited to emit light at a wavelength in the visible light region (for example, the green band) when irradiated with the electromagnetic wave near 265 nm. In FIG. 1, two parts surrounded by the dashed line are Rayleigh scattering (measurement noises) and are not the light emission of the ultraviolet detection material 10.

Figure 2:
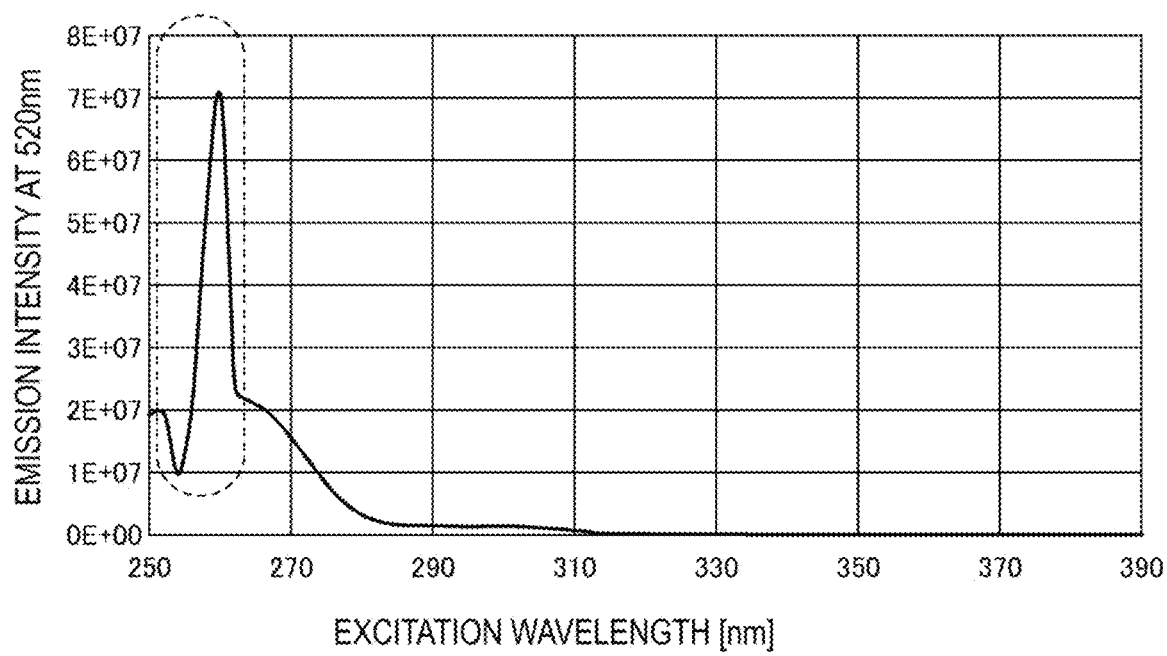
FIG. 2 shows a characteristic example of the ultraviolet detection material according to the present embodiment.

FIG. 2 shows a characteristic example of the ultraviolet detection material according to the present embodiment, showing excitation wavelengths of electromagnetic waves that can excite the ultraviolet detection material 10 at 520 nm. It can be seen from FIG. 2 that the ultraviolet detection material 10 is strongly excited by the electromagnetic waves having wavelengths of 280 nm or shorter and is also excited even by the electromagnetic waves having wavelengths longer than 280 nm and equal to or shorter than 310 nm. In addition, it can be seen from FIG. 2 that the ultraviolet detection material 10 is not excited even when irradiated with the electromagnetic waves having wavelengths longer than 310 nm.

In FIG. 2, a part surrounded by the dashed line is Rayleigh scattering (measurement noises) and is not the light emission of the ultraviolet detection material 10. In addition, since a xenon lamp was used as a light source for measuring the characteristic, the measurement was performed at the excitation wavelengths of 250 nm or longer. However, inferring from a shape on a short wavelength-side of the spectrum shown in FIG. 2, it is thought that the ultraviolet detection material 10 is excited even at the excitation wavelengths equal to or longer than 200 nm and shorter than 250 nm, thereby emitting light at the wavelength in the visible light region. Note that, since wavelengths shorter than 200 nm become a region called vacuum ultraviolet that easily absorbs oxygen and nitrogen, there is little need to discuss the sterilization effect, the virus inactivation effect, the effect on human bodies, and the like. Therefore, in the present disclosure, it is sufficient to consider wavelengths of 200 nm or longer.

Note that, the ultraviolet detection material 10 may be excited to emit light having a peak of an emission wavelength in 480 nm or longer and 700 nm or shorter by an electromagnetic wave having a wavelength of 310 nm or shorter, and the peak of the emission wavelength may also be in a region other than 500 nm to 550 nm.

Figure 3:
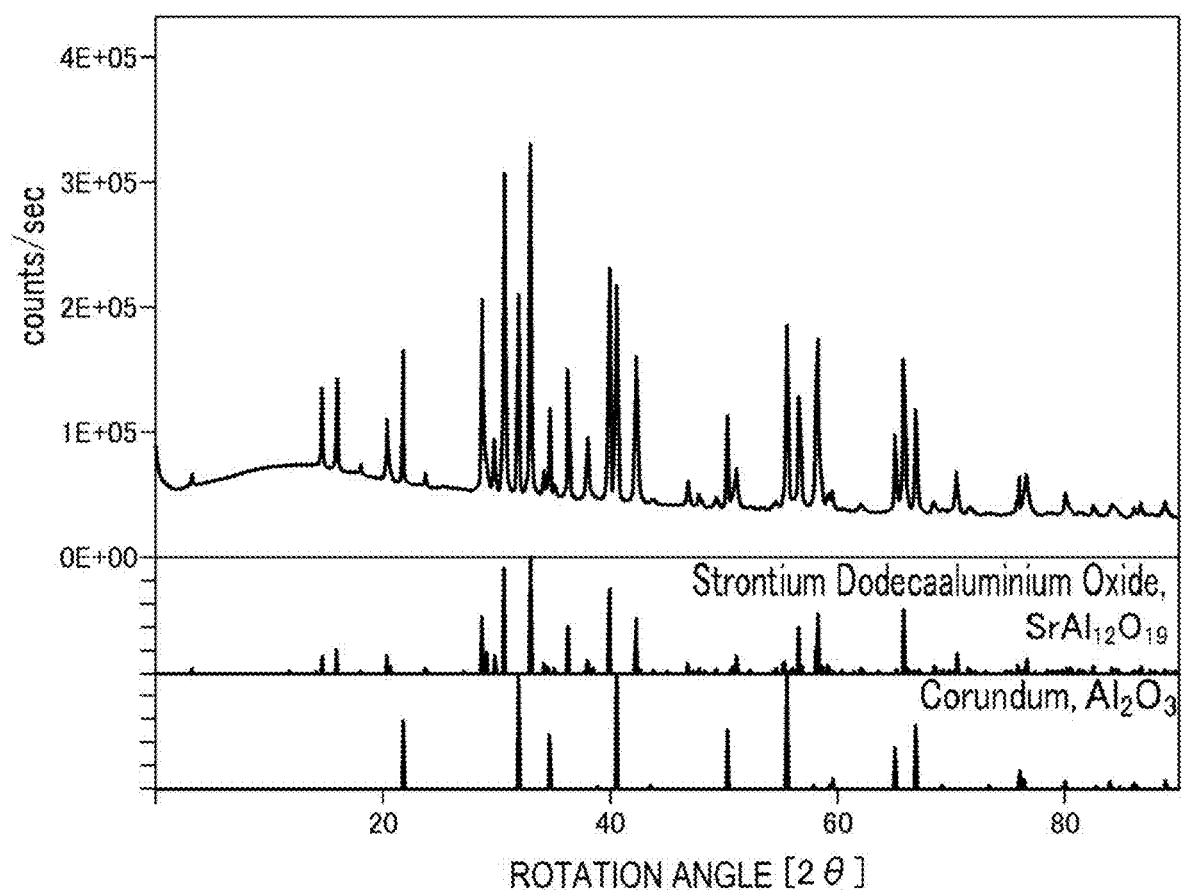
FIG. 3 shows an example of X-ray diffraction patterns of a composite oxide included in the ultraviolet detection material according to the present embodiment.

FIG. 3 shows an example of X-ray diffraction patterns of a composite oxide included in the ultraviolet detection material according to the present embodiment. As shown in FIG. 3, the ultraviolet detection material 10 has $SrAl_{12}O_{19}$ (hexagonal system) as a main phase and $Al_2O_3$ (corundum) as a sub-phase in a crystal phase. Ce, La and Mn are not detected by the X-ray diffraction. In other words, Ce, La and Mn are present in the composite oxide in such a form that they are not detected by the X-ray diffraction.

It is thought that strontium reacts with aluminum oxide to form $SrAl_{12}O_{19}$ phase, which is a main phase of the composite oxide, during firing and serves as a host of the light emission center element. It is also thought that aluminum reacts with strontium carbonate or its decarboxylated oxide to form $SrAl_{12}O_{19}$ phase, which is a main phase of the composite oxide, during firing, serves as a host of the light emission center element and is also stably present as a single corundum phase.

[Manufacturing Method of Ultraviolet Detection Material]

Figure 4:
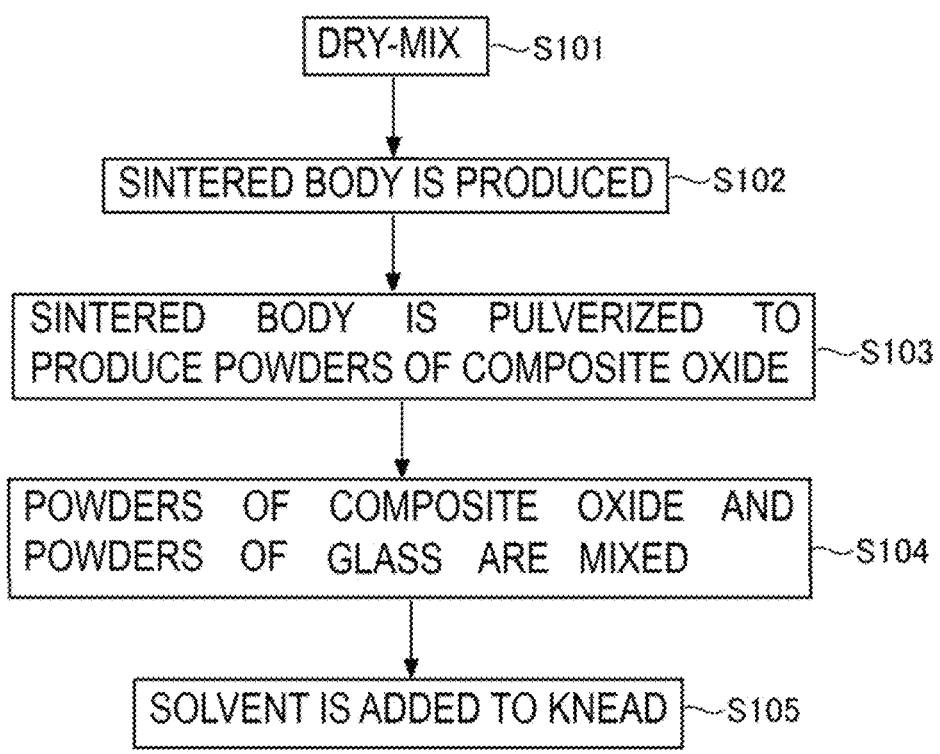
FIG. 4 is a flowchart showing a manufacturing method of the ultraviolet detection material according to the present embodiment.

FIG. 4 is a flowchart showing a manufacturing method of the ultraviolet detection material according to the present embodiment. As shown in FIG. 4, in order to manufacture the ultraviolet detection material 10, powders of a plurality of types of oxides, each of the oxides including at least one of aluminum, strontium, cerium, lanthanum and manganese are first dry-mixed in step S101. For example, aluminum oxide powders, strontium carbonate powders, cerium oxide powders, and lanthanum strontium manganese oxide powders are dry-mixed.

Next, in step S102, the powders of the plurality of types of oxides dry-mixed in step S101 are formed into a predetermined shape and fired at a temperature (for example, 1500° C.) equal to or higher than 1200° C. in the atmosphere. This produces a sintered body of the composite oxide including the above-described oxides. The main phase in the crystal phase of the sintered body produced in step S102 is $SrAl_{12}O_{19}$. Note that, if the firing is performed at a temperature lower than 1200° C., the yield of the ultraviolet detection material capable of distinctively detecting a wavelength region of UV-C is significantly lowered.

Next, in step S103, the sintered body produced in step S102 is pulverized to produce powders of the composite oxide. For pulverization, for example, a general-purpose pulverizer can be used. By adjusting pulverizing conditions of the pulverizer, it is possible to control an average particle size of the powders of the composite oxide. In order to stably emit visible light during irradiation of UV-C, the average particle size of the powders of the composite oxide is preferably equal to or greater than 100 μm. On the other hand, from standpoints of applying, printing and formability, the average particle size of the powders of the composite oxide is preferably equal to or smaller than 500 μm. Note that, the average particle size can be measured by a method using a normal particle size distribution measuring machine, a method of obtaining the average particle size from sedimentation rates of particles in a liquid medium by using the Stokes' law, and the like.

Next, in step S104, powders of glass having a softening point of 900° C. or lower are prepared, and the powders of the composite oxide and the powders of the glass are mixed to produce a mixture A. The glass used in step S104 is, for example, glass having bismuth oxide as a main component or having silicon oxide and barium oxide as main components and including boron oxide, or the like.

Next, in step S105, a predetermined solvent is added to the mixture A produced in step S104 to knead the component of the glass, thereby producing a mixture B in liquid or paste form. The produced mixture B is the ultraviolet detection material 10. Note that, a mixed amount (content rate) of the composite oxide in the mixture B is preferably 60 vol % or more.

Figure 5A:
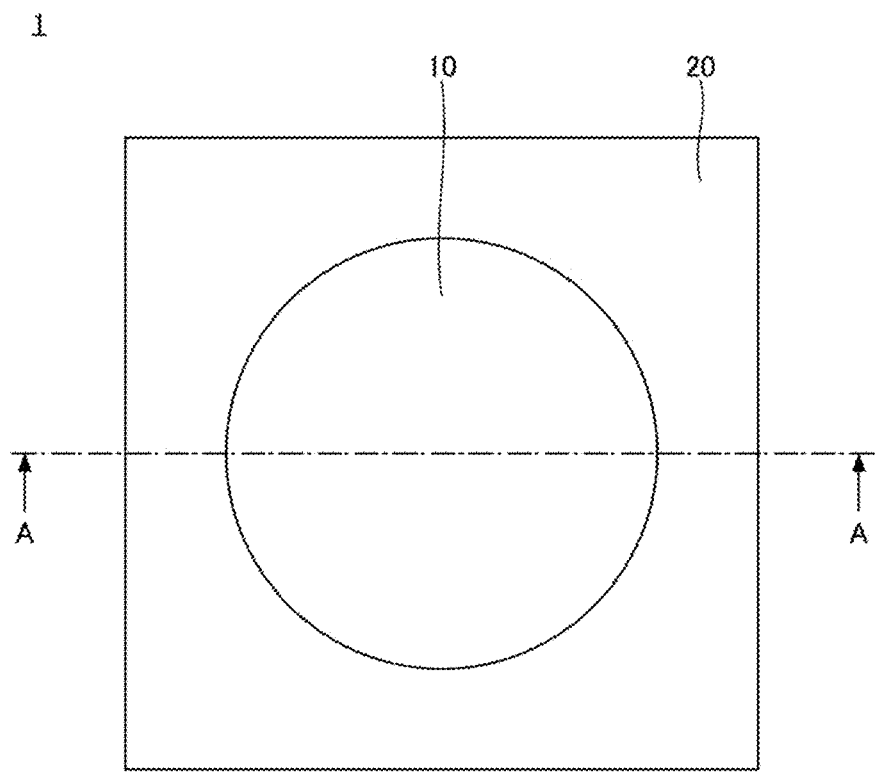
FIG. 5A shows an example of an ultraviolet detection device according to the present embodiment.
Figure 5B:
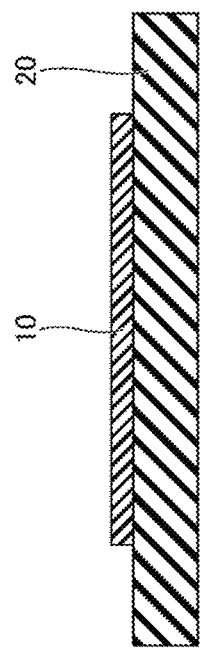
FIG. 5B shows the example of the ultraviolet detection device of FIG. 5A.

Next, an ultraviolet detection device where the ultraviolet detection material 10 is arranged on a substrate is described. FIGS. 5A and 5B show an example of the ultraviolet detection device according to the present embodiment, in which FIG. 5A is a plan view, and FIG. 5B is a cross-sectional view taken along a line A-A of FIG. 5A. The ultraviolet detection device 1 shown in FIGS. 5A and 5B includes a substrate 20 and the ultraviolet detection material 10 arranged on the substrate 20.

Figure 6:
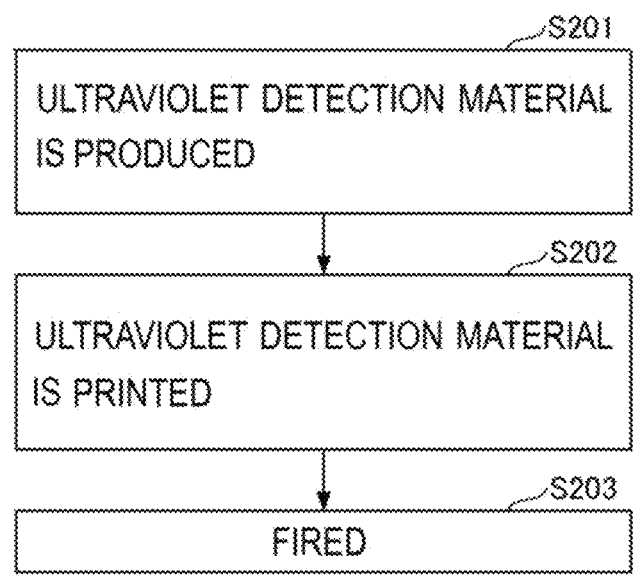
FIG. 6 is a flowchart showing a manufacturing method of the ultraviolet detection device according to the present embodiment.

FIG. 6 is a flowchart showing a manufacturing method of the ultraviolet detection device according to the present embodiment. As shown in FIG. 6, in order to manufacture the ultraviolet detection device 1, in step S201, the ultraviolet detection material 10 in liquid or paste form is first produced. The method of producing the ultraviolet detection material 10 is as described above with reference to FIG. 4.

Next, in step S202, the ultraviolet detection material 10 is printed and dried on the substrate 20. As the substrate 20, for example, a ceramic substrate can be used. For printing, for example, a metal mask method, a dispense method or the like can be used. A thickness of the ultraviolet detection material 10 after printing is, for example, about 200 μm to 600 μm.

Next, in step S203, the ultraviolet detection material 10 is fired at a temperature of 900° C. or lower for about 30 minutes. The firing may be performed in the atmosphere, for example. Thereby, the ultraviolet detection device 1 is obtained. In a case where the glass included in the ultraviolet detection material 10 is a bismuth oxide-boric acid system or phosphoric acid-copper oxide, the firing can be performed at a temperature of 500° C. or lower. Note that, a metal substrate such as SUS or a glass substrate such as quartz glass can also be used instead of the ceramic substrate, as long as it can withstand the firing after printing.

Hereinafter, Examples are described. However, the present invention is not limited to these Examples.

Example 1

100 parts by weight of aluminum oxide powders, 12 parts by weight of strontium carbonate powders, 2.3 parts by weight of cerium oxide powders and 2.3 parts by weight of lanthanum strontium manganese oxide powders were dry-mixed and then fired at 1500° C. for 10 hours in the atmosphere, so that a sintered body was obtained. The molar concentration of each oxide component is 89.4 mol % for $Al_2O_3$, 7.6 mol % for SrO, 1.2 mol % for $CeO_2$, 0.8 mol % for $La_2O_3$, and 1.0 mol % for $MnO_2$.

The molar concentration of each of the above-described oxide components is converted from the weight. Note that, the strontium carbonate powders are changed to SrO by firing.

Next, the sintered body was pulverized to produce powders of the composite oxide. The average particle size of the produced powders of the composite oxide was equal to or greater than 100 μm and equal to or smaller than 500 μm. Then, 70 parts by weight of the powders of the composite oxide and 30 parts by weight of the powders of bismuth oxide-boric acid system glass were mixed, and a commercially available solvent consisting of ethyl cellulose, telepineol and butyl carbitol acetate was added for kneading, so that an ultraviolet detection material 10A in paste form was produced. A ceramic substrate 20A made of 99.9% alumina was prepared and the ultraviolet detection material 10A was printed and dried on the ceramic substrate 20A, which was then fired at 500° C. for 30 minutes in the atmosphere, so that an ultraviolet detection device 1A was produced.

Example 2

The ultraviolet detection material 10B was produced in a similar manner to Example 1. In addition, a ceramic substrate 20B having an alumina purity of 94% and a balance of 6% including silicon oxide, calcium oxide, and magnesium oxide components was prepared. The ultraviolet detection material 10B was printed and dried on the ceramic substrate 20B, which was then fired at 500° C. for 30 minutes in the atmosphere, so that an ultraviolet detection device 1B was produced.

Comparative Example

As Comparative Example, a ceria-alumina system fluorescent ceramic 100 that emits light at entire region wavelengths of ultraviolet was prepared.

[Check for Light Emission]

Figure 7A:
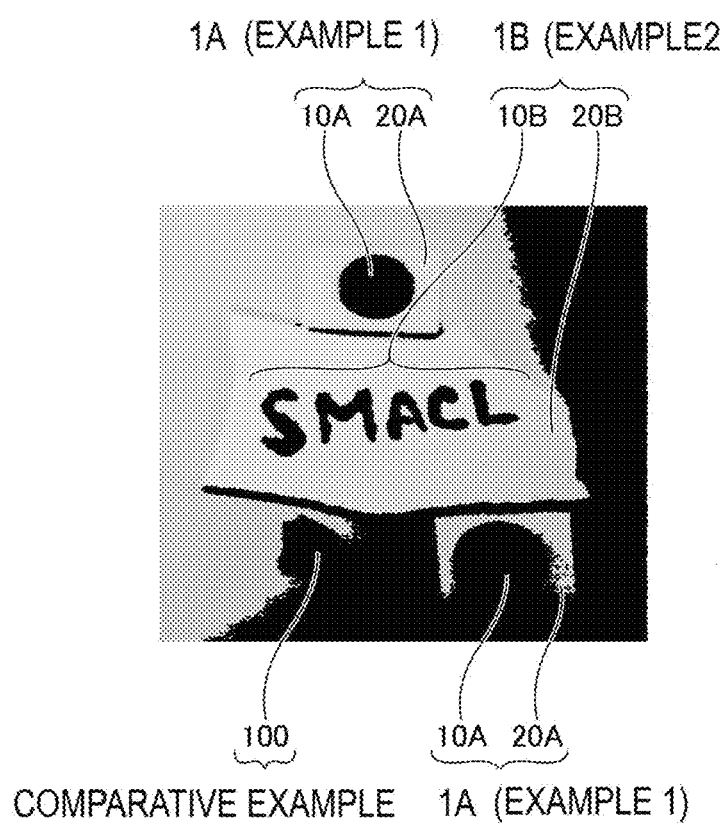
FIG. 7A shows results of Examples and Comparative Example.

FIG. 7A shows an aspect where the ultraviolet detection device 1A, the ultraviolet detection device 1B and the ceria-alumina system fluorescent ceramic 100 were irradiated with a fluorescent lamp, for reference. Note that, 'SMACL' shown in FIG. 7A and the like is an arrangement of initial letters of Sr, Mn, Al, Ce and La.

Figure 7B:
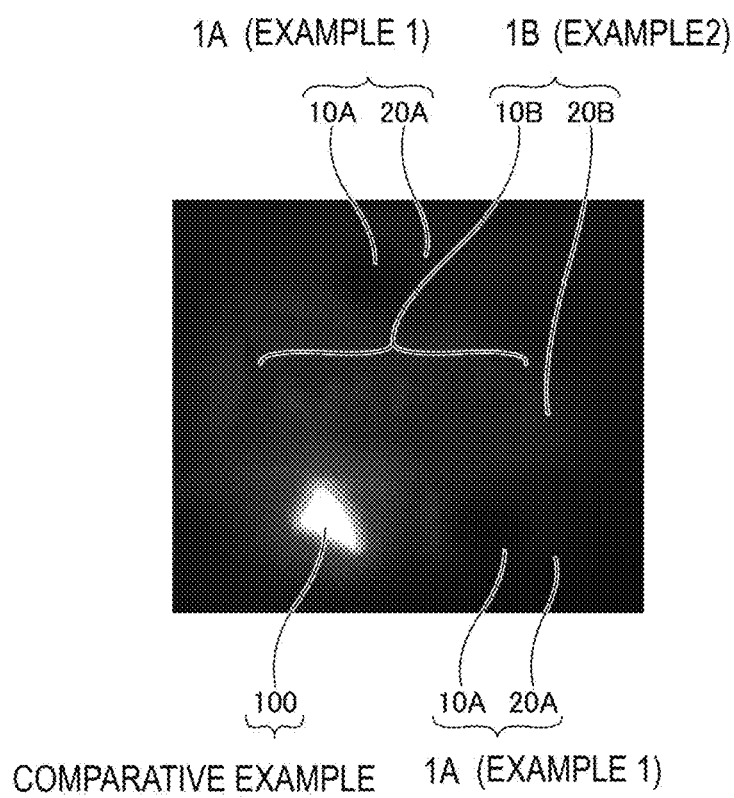
FIG. 7B shows results of Examples and Comparative Example.

Next, the ultraviolet detection device 1A, the ultraviolet detection device 1B and the ceria-alumina system fluorescent ceramic 100 were irradiated with ultraviolet having a wavelength of 365 nm by an ultraviolet exposure apparatus, and the presence or absence of the light emission was checked. As a result, as shown in FIG. 7B, neither the ultraviolet detection device 1A produced in Example 1 nor the ultraviolet detection device 1B produced in Example 2 emitted the light at the excitation wavelength of 365 nm. In contrast, the ceria-alumina system fluorescent ceramic 100 emitted light at the excitation wavelength of 365 nm. Note that, 365 nm is ultraviolet belonging to UV-A.

Figure 7C:
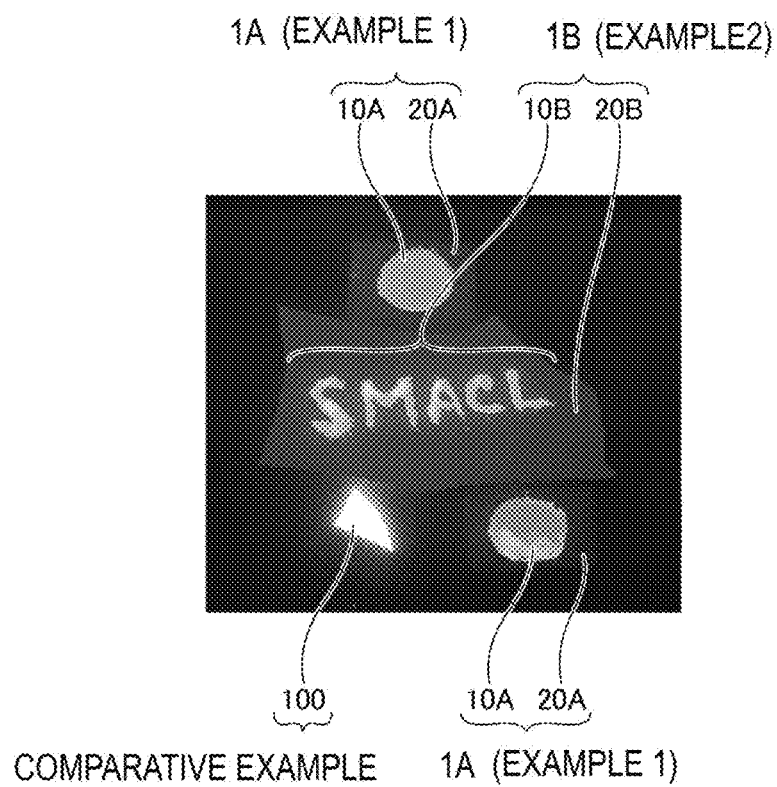
FIG. 7C shows results of Examples and Comparative Example.

Next, the ultraviolet detection device 1A, the ultraviolet detection device 1B and the ceria-alumina system fluorescent ceramic 100 were irradiated with ultraviolet having a wavelength of 254 nm by the ultraviolet exposure apparatus, and the presence or absence of the light emission was checked. As a result, as shown in FIG. 7C, it was checked that both the ultraviolet detection device 1A produced in Example 1 and the ultraviolet detection device 1B produced in Example 2 emitted the strong green-white light at the excitation wavelength of 254 nm. In addition, the ceria-alumina system fluorescent ceramic 100 emitted light at the excitation wavelength of 254 nm. Note that, 254 nm is ultraviolet belonging to UV-C.

As described above, in the ultraviolet detection device 1A relating to Example 1 and the ultraviolet detection device 1B relating to Example 2, the ultraviolet detection material 10A emitted lights in different light emission aspects under irradiations of UV-A and UV-C. That is, the ultraviolet detection material did not emit light under irradiation of UV-A but strongly emitted lights under irradiation of UV-C. Therefore, it is possible to detect the presence or absence of irradiation of UV-C by the ultraviolet detection devices 1A and 1B using the ultraviolet detection material 10A.

It was also checked that the ultraviolet detection material 10A can exerts its effects even when it is printed and fired on the ceramic substrate 20A having a high alumina purity and printed and fired on the ceramic substrate 20B having a relatively low alumina purity. That is, the ultraviolet detection material 10A has a high degree of freedom in selection of the substrate on which it is printed. The reason is that because the softening point of glass included in the ultraviolet detection material 10A is low, the firing temperature can be lowered at the time of printing and firing the ultraviolet detection material 10A in paste form on the ceramic substrate and reaction between the ultraviolet detection material 10A and the ceramic substrate can be accordingly suppressed. A metal substrate such as SUS or a glass substrate such as quartz glass can also be used instead of the ceramic substrate, as long as it can withstand the firing after printing.

Note that, the molar concentrations of the respective oxide components of the composite oxide shown in Examples 1 and 2 are just exemplary. The molar concentrations of the respective oxide components can be changed as appropriate. For example, the molar concentration of aluminum oxide may be changed within a range of 84.9 or more and 93.8 or less in molar percent, the molar concentration of strontium oxide may be changed within a range of 7.2 or more and 8.0 or less in molar percent, the molar concentration of cerium oxide may be changed within a range of 1.1 or more and 1.3 or less in molar percent, the molar concentration of lanthanum oxide may be changed within a range of 0.8 or more and 0.9 or less in molar percent and the molar concentration of manganese oxide may be changed within a range of 1.0 or more and 1.1 or less in molar percent, respectively.

As described above, the ultraviolet detection material according to the present embodiment includes the composite oxide including aluminum, strontium, cerium, lanthanum and manganese, and the glass having a softening point of 900° C. or lower, is not excited by the electromagnetic wave having a wavelength longer than 310 nm and is excited by the electromagnetic wave having a wavelength equal to or shorter than 310 nm, thereby emitting light having a peak of an emission wavelength in 480 nm or longer and 700 nm or shorter. For this reason, the presence or absence and the reachable range of irradiation of UV-C, which highly affects the living organism and viruses, can be visually checked by the light emission having a wavelength in the visible light region, so that the wavelength region of ultraviolet can be distinctively detected.

In addition, according to the ultraviolet detection material of the present embodiment, it is not necessary to supply the energy for detection of UV-C, so that it is possible to detect UV-C promptly and conveniently at low cost. Further, since the ultraviolet detection material of the present embodiment can be formed into a specific shape and applied to a test object or a test place through a heat treatment in a relatively low-temperature region by mixing with the glass having a softening point of 900° C. or lower, a degree of freedom in a use method can be improved.

Further, the ultraviolet detection material of the present embodiment can be sintered at temperatures of 900° C. or lower. That is, it is possible to produce a luminous body having a desired shape at relatively low temperatures by using the ultraviolet detection material of the present embodiment. Furthermore, when printing the ultraviolet detection material of the present embodiment in paste form and then firing the same for formation into a desired shape, the ultraviolet detection material is not affected by a composition of a material of the substrate that is a base. Further, since the ultraviolet detection material of the present embodiment requires a relatively low firing temperature after printing on a ceramic substrate or the like, there is no harmful interaction with the ceramic substrate or the like.

Further, since the ultraviolet detection material of the present embodiment is a mixture of the composite oxide and the glass, the ultraviolet detection material is superior in heat resistance and weather resistance, as compared to a mixture of a composite oxide and an organic material. For example, a mixture of a composite oxide and an organic material is deteriorated due to an oxidation reaction, hydrolysis or ultraviolet irradiation, depending on use environments. However, there are no such concerns in the ultraviolet detection material of the present embodiment, which is a mixture of the composite oxide and the glass.

Although the preferred embodiment and the like have been described in detail, the present invention is not limited to the above-described embodiment and the like, and a variety of changes and replacements can be made for the above-described embodiment and the like without departing from the scope defined in the claims.

This disclosure further encompasses various exemplary embodiments, for example, described below.

[1] A manufacturing method of an ultraviolet detection material, the manufacturing method comprising:
producing powders of a composite oxide including aluminum, strontium, cerium, lanthanum and manganese
producing a mixture of powders of the composite oxide and powders of glass having a softening point of 900° C. or lower, and
adding a solvent to the mixture and kneading the mixture,
wherein the producing of powders of the composite oxide comprises:
mixing and firing powders of a plurality of types of oxides, each of the oxides including at least one of aluminum, strontium, cerium, lanthanum and manganese, at a temperature of 1200° C. or higher in the atmosphere, thereby producing a sintered body of the composite oxide, and
pulverizing the sintered body to produce powders of the composite oxide, and
wherein the ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

[2] A manufacturing method of an ultraviolet detection device, the manufacturing method comprising:
producing an ultraviolet detection material in liquid or paste form comprising a composite oxide including aluminum, strontium, cerium, lanthanum and manganese, and glass having a softening point of 900° C. or lower, wherein the ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter;
printing the ultraviolet detection material on a substrate; and
firing the ultraviolet detection material at a temperature of 900° C. or lower.

What is claimed is:

1. An ultraviolet detection material comprising:
a composite oxide including aluminum, strontium, cerium, lanthanum and manganese; and
a glass having a softening point of 900° C. or lower,
wherein the ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter,
the composite oxide has $SrAl_{12}O_{19}$ as a main phase and $Al_2O_3$ as a sub-phase in a crystal phase, and
cerium, lanthanum and manganese are present in the composite oxide in such a form that they are not detected by an X-ray diffraction.

2. The ultraviolet detection material according to claim 1, wherein an excitation wavelength peak is 280 nm or shorter.

3. The ultraviolet detection material according to claim 1, wherein the glass has bismuth oxide as a main component or the glass has silicon oxide and barium oxide as main components and includes boron oxide.

4. The ultraviolet detection material according to claim 1, wherein a content rate of the composite oxide is 60 vol % or more.

5. The ultraviolet detection material according to claim 1, wherein the composite oxide has an average particle size of 100 μm or greater.

6. An ultraviolet detection device comprising:
a substrate; and
the ultraviolet detection material according to claim 1 arranged on the substrate.

* * * * *